Sept. 27, 1932.  E. R. FITCH  1,879,674
SAFETY CAR EQUIPMENT
Filed Feb. 27, 1929
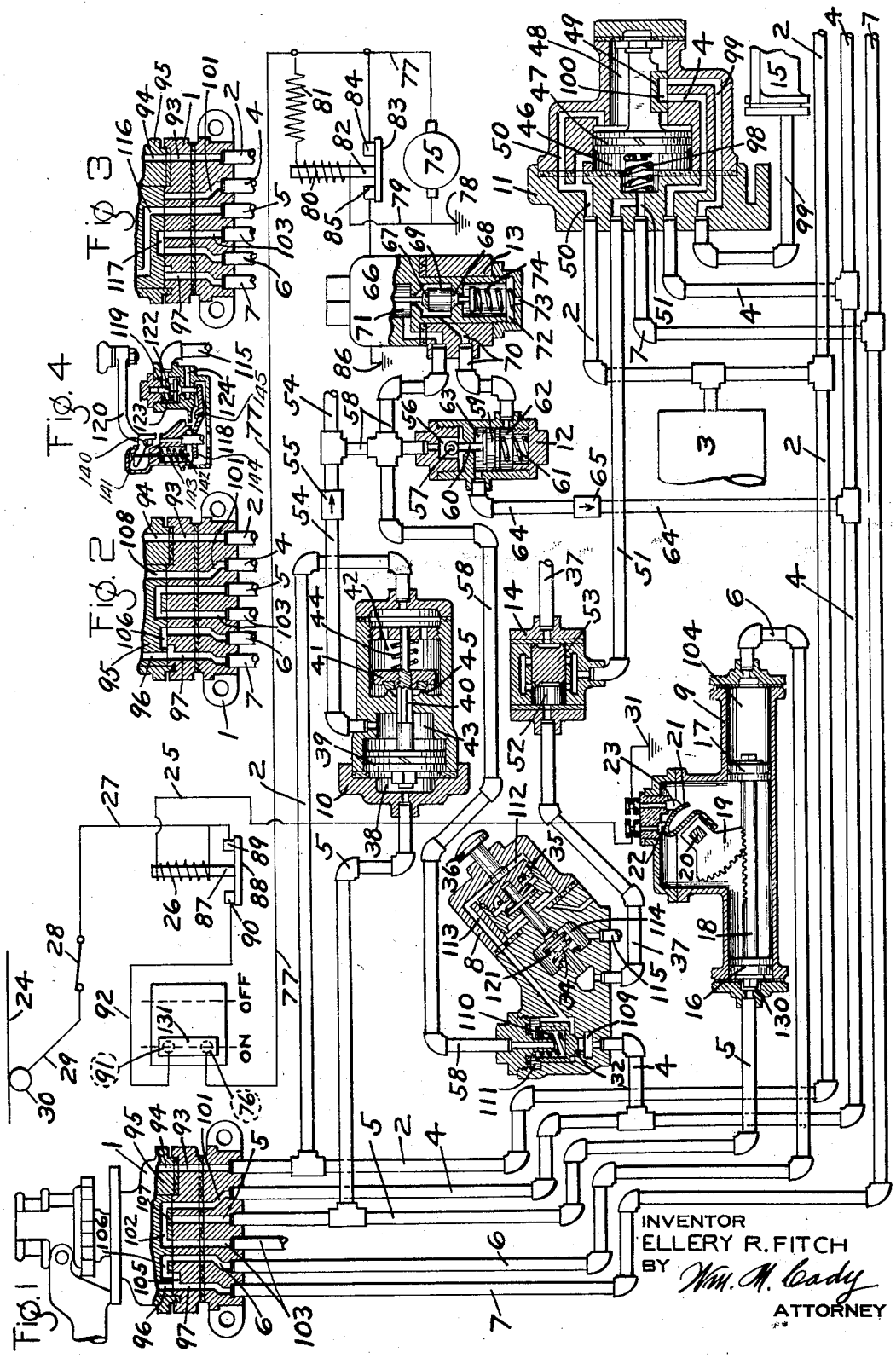
INVENTOR
ELLERY R. FITCH
BY Wm. M. Cady
ATTORNEY Patented Sept. 27, 1932

1,879,674

UNITED STATES PATENT OFFICE

ELLERY R. FITCH, OF WESTWOOD, NEW JERSEY, ASSIGNOR TO THE WESTINGHOUSE AIR BRAKE COMPANY, OF WILMERDING, PENNSYLVANIA, A CORPORATION OF PENNSYLVANIA

SAFETY CAR EQUIPMENT

Application filed February 27, 1929. Serial No. 343,007.

This invention relates to fluid pressure brakes and car controlling apparatus and more particularly to safety car control equipment.

It has heretofore been proposed to provide a car door and brake controlling equipment comprising a brake valve device having a door opening position in which fluid under pressure is supplied to apply the brakes and is also supplied to a door engine to effect the opening of the car doors.

With the above equipment, the brake cylinder pressure will build up to the full pressure carried in the main reservoir if the brake valve is left in door open position, and in order to avoid this and prevent the unnecessary waste of fluid under pressure, it has also been proposed to provide means for limiting the pressure of fluid supplied to the brake cylinder in the door open position of the brake valve. The brake valve device of this equipment is also provided with another position for applying the brakes without opening the car doors and in which the pressure in the brake cylinder may be built up as desired to the limit of pressure carried in the main reservoir.

In this latter equipment, in order to avoid a rough stop, it is necessary that the operator apply the brakes and then graduate the pressure down as the car approaches a stop, and then in order to open the car doors it is necessary to move the brake valve handle to door open position after the car has actually been brought to a stop, and in this position fluid under pressure is again supplied to the brake cylinder up to the pressure of the pressure limiting device.

It has been further proposed to provide a fluid pressure brake apparatus having means by which the brakes may be applied in the door open position of the brake valve without opening the car doors unless the speed of the car has been reduced to a low degree such that the car is practically at a stop.

The principal object of my invention is to provide an improved fluid pressure brake and car door controlling apparatus by which the doors are opened and the pressure of fluid supplied to the brake cylinder is limited when the car is moving at or under a predetermined low speed and the brake valve device is operated to door open position.

Another object of my invention is to provide an improved fluid pressure brake and car door controlling apparatus which, when the car is moving at or under a predetermined low speed and the brake valve device operated to door open position, will operate to cause the doors to open and to effect a limited application of the brakes, and which, when the car is moving at speeds over said predetermined low speed and the brake valve device operated to door open position, will operate to cause the doors to open and effect a full application of the brakes.

Another object of my invention is to provide a safety car control equipment by which a dead man's emergency application of the brakes is prevented when the pressure of fluid supplied to the brake cylinder is limited in effecting an application of the brakes with the car moving at or under a predetermined low speed, or after the car has been brought to a stop with the limited brake cylinder pressure.

A further object of my invention is to provide a safety car control equipment having means operative by the usual door engine for controlling the opening of the car motor control circuit when the car doors are opened and for controlling the closing of the circuit when the car doors are closed.

Other objects and advantages will appear in the following more detailed description of the invention.

In the accompanying drawing, Figure 1 is a diagrammatic view, mainly in section, of a fluid pressure brake and car door controlling apparatus, the brake valve device being shown in release position and the remainder of the equipment being shown in their proper positions with the car being propelled by the car motor at a speed greater than a predetermined low speed; Fig. 2 is a fragmentary sectional view through the brake valve device showing the rotary valve thereof in service position; Fig. 3 is a like sectional view showing the rotary valve in service door open position; and Fig. 4 is a sectional view of the controller handle device.

As shown in the drawing, the equipment may comprise a brake valve device 1 having connections to a main reservoir pipe 2, leading to the usual main reservoir 3, a straight air pipe 4, a door opening pipe 5, a door closing pipe 6, and an emergency pipe 7. With a double end equipment, a similar brake valve device with the same pipe connections is provided at each end of the car. Each car of a double end equipment is also provided with a foot valve device 8, a controller handle and pilot valve device 118, and with a door engine 9 at each end of the car.

Each car is also provided with a relay brake controlling valve device 10, an emergency valve device 11, a pressure limiting valve device 12, a magnet valve device 13, a double check valve device 14, and a brake cylinder 15.

Each door engine may comprise a casing containing connected pistons 16 and 17, the movement of the pistons to the left being adapted to effect the closing of the doors and the movement to the right the opening of the car doors.

The pistons 16 and 17 are connected together by a toothed member 18 which is adapted to be moved by said pistons to operate a meshing toothed segment 19 secured to a door operating shaft 20.

Secured to the segment 19 is a connector 21 which, when the door is closed, is adapted to connect contact terminals 22 and 23 mounted in the door engine casing and suitably insulated from each other and the casing. The contact terminal 22 is connected with the trolley wire 24 over a wire 25, a magnet coil 26 of a contact switch device, a wire 27, a line switch 28, a wire 29, and the usual trolley wheel 30. The contact terminal 23 is connected to ground at 31.

The foot valve device 8 may comprise a casing containing a relay valve 32 and a valve 34 adapted to be operated by a piston 35 and a foot button 36 for controlling communication from one side of the relay valve 32 to the safety control pipe 37.

The relay valve device 10 may comprise a casing having a piston chamber 38 connected to the door opening pipe 5, and containing a piston 39 having a fluted stem 40 which is adapted to engage and control the operation of a valve 41 contained in a chamber 42 for establishing or closing off communication of the chamber 42 with a chamber 43 at one side of the piston 39, the chamber 42 being connected to the main reservoir pipe 2. Also contained in the chamber 42 and interposed between the valve 41 and the casing is a coil spring 44, the pressure of which is adapted to normally maintain the valve 41 seated against a seat ring 45.

The emergency valve device 11 comprises a casing having a piston chamber 46 connected to the main reservoir pipe 2 by way of a passage 50, and containing a piston 47, and a valve chamber 48 containing a slide valve 49 adapted to be operated by said piston, the valve chamber 48 being connected through passage 50 with the main reservoir pipe 2. The piston chamber is also connected to the emergency pipe 7 and is further connected to the safety control pipe 37 through a passage and pipe 51 and a valve chamber 52 at one side of the double check valve 53 of the device 14.

Leading from the chamber 43 in the relay valve device 10 is a pipe 54 and interposed in this pipe is a non-return check valve 55.

The pressure limiting valve device may comprise a casing having a valve chamber 56 containing a ball check valve 57 and connected to the pipe 54, beyond the non-return side of the check valve 57, by a pipe 58. Mounted in the casing is a piston 59 having a stem 60 adapted to engage the valve 57 and said piston is subject to the pressure of a spring 61 contained in a chamber 62 at one side of the piston 59. A chamber 63 at the other side of the piston is connected to the straight air pipe 4 through a pipe 64, there being a non-return check valve 65 interposed in the pipe 64.

The magnet valve device 13 comprises a magnet 66 which is adapted to control the operation of double beat valves 67 and 68 contained in a chamber 69 connected to the chamber 62 in the limiting valve device 12 through a pipe and passage 70. The magnet 66 may be of the usual well known type comprising a hollow core about which there is a winding, and further comprising an armature having a stem extending through the hollow core into operative engagement with the valve 67. The valve 67 is adapted to control communication from a chamber 71, with which the pipe 58 is connected, to the valve chamber 69. The valve 68 is adapted to control communication from the valve chamber 69 to a chamber 72 which is connected to atmosphere through a passage 73 and which contains a spring 74 to the pressure of which the double beat valves 67 and 68 are subject.

For propelling the car the usual electric motor 75 is employed, which is controlled by the usual motor controller (not shown). One terminal of the motor 75 is connected, over a wire 77, to a contact terminal 76 arranged in the controller, and the other terminal is connected to ground at 78 by wire 79. Around the motor is a shunt circuit comprising a wire connected to the wire 77 and to one terminal of a magnet coil 80 of a magnet switch device, there being a suitable resistance 81 interposed in the wire. The other terminal of the coil 80 is connected to ground 78 by the wire 79.

The coil 80 when energized is adapted to operate an armature 82 to such a position that a connector 83 carried thereby connects contact terminals 84 and 85 which are connected to wire 77 and to one terminal of the magnet 66 respectively, the other terminal of the magnet being connected to ground at 86.

When the coil 26 of the first mentioned magnet switch device is energized, the armature 87 of said switch is operated to such a position that a connector 88 connects contact terminals 89 and 90. The contact terminal 89 is connected to the supply wire 27 and the contact terminal 90 is connected by a wire 92 to a contact terminal 91 arranged in the motor controller.

The controller handle and pilot valve device 118 may comprise a casing having a pin 140 carried thereby and upon which a safety controller handle 120 is pivotally mounted. One end of this handle 120 is provided with a slot for receiving the upper end portion of a pin 141. The lower end of the pin 141 carries a nut 142 and interposed between this nut and the casing is a spring 143, which tends to force the pin 141 downwardly to engage one end of a lever 144 pivotally mounted on a pin 145 carried by the casing.

The lever 144 is adapted to operate a pilot valve 119 which is adapted in one position to establish communication from the pipe 115 to the atmosphere and in another position to close said communication.

In operation, with the brake valve device 1 in release position, fluid under pressure from the main reservoir 3 is supplied to the piston chamber 46 of the emergency valve device through pipe 2, a passage 93 in the brake valve device, a port 94 in the rotary valve 95 of the brake valve device, a chamber at the top of the rotary valve, a port 96 in the rotary valve, a passage 97, emergency pipe 7, and passage 51. Fluid under pressure from the main reservoir is also supplied to the valve chamber 48 in the emergency valve device through pipe 2 and passage 50.

Since the pressures of fluid in the chambers 46 and 48 are substantially equal, the pressure of a spring 98 contained in the piston chamber 46, maintains the emergency piston 47 and associated slide valve 49 in its right hand or release position, in which the brake cylinder is connected to the atmosphere through a pipe and passage 99, a cavity 100 in the emergency slide valve, passage and pipe 4, a passage 101 in the brake valve device 1, a port 102 in the rotary valve 95 and an exhaust passage and pipe 103.

From the port 96 in the rotary valve of the brake valve device, the piston chamber 104 in the casing of the door engine is supplied with fluid under pressure by way of a cavity 105 in the rotary valve seat, a port 106 and passage and pipe 6. The piston chamber 130 in the casing of the door engine and containing the piston 16 is connected to atmosphere by way of pipe and passage 5 and a port 107 opening into the port 102. With the chamber 104 thus charged and the chamber 130 connected to atmosphere, the pistons 16 and 17 are held in position for maintaining the car doors closed.

With the trolley 30 engaging the trolley wire 24, the line switch 28 closed and the car doors closed, the coil 26, of one of the magnet switch devices, is energized, so that the connector 88 closes the circuit through the contact terminals 89 and 90.

With the car in motion, and the motor controller in any power on position, a connector 131 in the controller connects the contact terminals 76 and 91 so that current is supplied over the wire 77 to the car motor 75. Current from the wire 77 also flows through the resistance 81, coil 80 and wire 79 to ground 78, energizing said coil so that the connector 83 of the magnet switch device closes the circuit through the magnet 66, thus energizing said magnet.

Magnet 66 being energized, the magnetic pull of the core causes the magnet armature and armature stem to move downwardly so that the valve 67 is unseated and the valve 68 seated against the pressure of the spring 74.

If it is desired to bring the car to a stop, the operator moves the motor controller handle to power off position, so as to cut off the supply of current to the car motor 75, but the coil 80 will still remain energized by the counter-electromotive force of the car motor, so long as the car is traveling at an appreciable speed, thus maintaining the magnet 66 of the magnet valve device energized.

After cutting off the power to the car motor, the operator may operate the brake valve device 1 to service position, shown in Fig. 2 of the drawing, in which the atmospheric connection from the brake cylinder through passage 101 in the brake valve device and cavity 102 in the rotary valve 95 is closed off and a communication established through the medium of a port 108 in the rotary valve 95 through which fluid, at main reservoir pressure, present in the usual chamber above the rotary valve, is supplied to the brake cylinder 15 by way of passage 101, pipe and passage 4, cavity 100 in the emergency slide valve 49, and passage and pipe 99.

Fluid under pressure thus supplied through the pipe 4 also flows to a chamber 109 in the foot valve device, and when the pressure in this chamber is sufficient to overcome the pressure of a spring 110 contained in a chamber 111 and acting on the valve 32, said valve will be unseated, so that fluid under pressure will flow to a chamber 112 at one side of the piston 35 by way of a passage 113, and this pressure will maintain the valve 34 seated.

When the car is in motion, with the brakes released, the operator either maintains the valve 34 seated by the use of the foot button 36, or maintains the controller handle 120 depressed so that the pin 141 does not engage the lever 144. Since the lever is not engaged by the pin 141, the pressure of the spring 122 maintains the pilot valve 119 seated. Should the operator be incapacitated so that he can no longer maintain either the foot button 36 or the controller handle 120 depressed, the valve 34 will be unseated, due to the pressure of a spring 121 contained in the chamber 114 in the foot valve device, and the pilot valve 119 of the controller handle device 118 will be unseated against the pressure of a spring 122 contained in the pilot valve chamber 123, so that fluid under pressure from the emergency piston chamber 46 would be vented to the atmosphere by way of passage and pipe 51, chamber 52 in the double check valve device 14, pipe 37, past the unseated foot valve 34, through valve chamber 114, pipe 115 past the unseated pilot valve 119, and through the pilot valve chamber 123 and an atmospheric passage 124. With the emergency piston chamber 46 thus vented to the atmosphere, the pressure of fluid in the emergency slide valve chamber 48, as supplied from the main reservoir 3 through pipe 2 and passage 50, causes the emergency piston 47 to move to its extreme left hand position against the pressure of the spring 98, carrying with it the slide valve 49. When the slide valve 49 is thus shifted, it uncovers the passage 99 so that fluid under pressure flows from the slide valve chamber 48 to the brake cylinder 15 through the passage and pipe 99, thus effecting an emergency application of the brakes.

As the speed of the car is reduced, the operator, by the use of the brake valve device 1, may gradually reduce the brake cylinder pressure to bring the car to a gentle stop. Now when the speed of the car has been reduced to some low speed, say for instance to a speed of three miles per hour, the counter-electro-motive force of the car motor 75 will not be sufficient to energize the coil 80, so that the connector 83 will be operated out of contact with the contact terminals 84 and 85, causing the magnet 66 to be deenergized. With the magnet 66 thus deenergized, the pressure of the spring 74 causes the valve 67 to seat and the valve 68 to unseat.

The operator may now operate the brake valve device to door open brake applied position, in which the passage 101 leading to the straight air pipe 4 is lapped and fluid at main reservoir pressure present in the chamber over the rotary valve 95 is supplied to the door opening passage and pipe 5 through a port 116 in the rotary valve. With the brake valve device in this position, fluid under pressure in the piston chamber 104 in the door engine 9 is vented to the atmosphere through the door closing pipe and passage 6, a cavity 117 in the rotary valve 95, and exhaust passage and pipe 103.

Fluid under pressure flows from the pipe 5 to the piston chamber 38 in the relay valve device 10, causing the piston 39 to move toward the right, unseating the valve 41 so that fluid at main reservoir pressure in the chamber 42 flows past the unseated valve to the brake cylinder by way of chamber 43 in the relay valve device, pipe 54, check valve 55, pipe 58, limiting valve chamber 56, past the unseated valve 57 and around the stem 60 of the piston 59, piston chamber 63, pipe 64, check valve 65, pipe and passage 4, cavity 100 in the emergency slide valve 49 and passage and pipe 99.

Since the valve 68 of the magnet valve device 13 is unseated, the chamber 62 in the pressure limiting valve device 12 is vented to the atmosphere through pipe and passage 70, valve chamber 69 in the magnet valve device, past the unseated valve 68, chamber 72, and atmospheric passage 73.

Now when brake cylinder pressure present in chamber 63 in the limiting valve device becomes great enough to overcome the pressure of the spring 61, the piston 59 will move downwardly and permit the valve 57 to seat and close off the further supply of fluid under pressure to the brake cylinder. By thus limiting the brake cylinder pressure, the car will come to a stop gently.

Since the pipe 4 is connected to the chamber 109 in the foot valve device, said chamber will be charged with fluid at brake cylinder pressure which may not be sufficient to unseat the valve 32 to supply fluid under pressure to the piston chamber 112 and maintain the valve 34 seated. To insure the seating of the valve 34, when the brake cylinder pressure is limited, fluid at main reservoir pressure is supplied to the piston chamber 112 through pipe 58, chamber 111, and passage 113.

Fluid under pressure from the door opening pipe 5 also flows to the piston chamber 130 in the door engine, and since the chamber 104 in the door engine is vented to the atmosphere as hereinbefore described, the pressure of fluid in chamber 130 causes the door engine pistons 16 and 17 to move to the right to their door open position. When the car doors are being operated to their open positions, the connector 21, which is attached to the segment 19 of the door engine 9, is moved out of connecting engagement with the contact terminals 22 and 23 so that the circuit through the coil 26 of one of the magnet switch devices is opened, thus deenergizing the coil 26, which permits the armature 87 to operate the connector out of connecting engagement with the contact terminals 89 and 90. With the connector 88 in this position, the car motor circuit is open and can only be closed by the closing of the doors. It will thus be seen that the operator cannot start the car before the doors are closed.

It will be seen that by limiting the brake cylinder pressure when the speed of the car has been reduced to some predetermined low speed, rough handling of the car is prevented and the release of the brakes will be effected more quickly than when brake cylinder pressure and main reservoir pressure are permitted to equalize to bring the car to a stop.

Should the operator move the brake valve device 1 to door open brake applied position, when the car is traveling at any speed greater than three miles per hour, the magnet 66 of the magnet valve device 13 will be energized, so that fluid under pressure will flow from the pipe 58 to the chamber 62 in the limiting valve device 12 through a chamber 71 in the magnet valve device 13, past the unseated valve 67, through chamber 69 and passage and pipe 70. Now since the pressures in the chambers 62 and 63 in the limiting valve device are substantially equal, the pressure of the spring 61 maintains the piston 59 in its upper position in which the valve 57 is maintained unseated, thus permitting fluid under pressure to flow to the brake cylinder without limitation by the limiting valve device.

The term "low speed" as used in the foregoing description and appended claims is intended to mean a speed at which it would be safe to open the car doors preparatory to bringing the car to a stop.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a vehicle controlling apparatus, the combination with mechanism for controlling the opening and closing of a car door and mechanism for controlling the application and release of the car brakes, of means for controlling the operation of the first mentioned mechanism to effect the opening of the car door and for controlling the operation of the second mentioned mechanism to effect an application of the brakes, and means operative to limit the braking power of the second mentioned mechanism when the speed of the car is reduced to a predetermined low degree and the first mentioned means is operated to control the opening of the car door and the effecting of an application of the brakes.

2. In a vehicle controlling apparatus, the combination with mechanism for controlling the opening and closing of a car door and mechanism for controlling the application and release of the car brakes, of means for controlling the operation of the first mentioned mechanism to effect the opening of the car door and for controlling the operation of the second mentioned mechanism to effect an application of the brakes, and means operative in accordance with the speed of the car and when the first mentioned means is operated to effect the opening of said door and an application of the brakes for governing the braking power of the second mentioned mechanism.

3. In a vehicle controlling apparatus, the combination with mechanism for controlling the opening and closing of a car door and mechanism for controlling the application and release of the car brakes, of means for controlling the operation of the first mentioned mechanism to effect the opening of the car door and for controlling the operation of the second mentioned mechanism to effect an application of the brakes, and electrically controlled means operative in accordance with the speed of the car and when the first mentioned means is operated to effect the opening of said door and an application of the brakes for governing the braking power of the second mentioned mechanism.

4. In a vehicle controlling apparatus, the combination with mechanism for controlling the opening and closing of a car door and mechanism for controlling the application and release of the car brakes, of means for controlling the operation of both of said mechanisms for simultaneously opening said door and effecting an application of the brakes, and electrically controlled means operative according to the speed of the car for limiting the braking power of the second mentioned mechanism.

5. In a vehicle controlling apparatus, the combination with mechanism for controlling the opening and closing of a car door and mechanism for controlling the application and release of the car brakes, of means for controlling the operation of both of said mechanisms for simultaneously opening said door and effecting an application of the brakes, and means operative in accordance with the speed of the car for governing the braking power of the second mentioned mechanism.

6. In a vehicle controlling apparatus, the combination with a brake cylinder, of valve means operative to supply fluid under pressure to the brake cylinder to effect an application of the brakes, mechanism for controlling the opening and closing of a car door, means for supplying fluid under pressure to said mechanism to effect the opening of said door and for operating said valve means to supply fluid under pressure to the brake cylinder, and means operative in accordance with the speed of the car for governing the pressure of fluid supplied to the brake cylinder.

7. In a vehicle controlling apparatus, the combination with a brake cylinder, of valve means operative to supply fluid under pressure to the brake cylinder to effect an application of the brakes, mechanism for controlling the opening and closing of a car door, means for supplying fluid under pressure to said mechanism to effect the opening of said door and for operating said valve means to supply fluid under pressure to the brake cylinder, and means operative when the speed of the car is at a low degree for limiting the pressure of fluid supplid to the brake cylinder.

8. In a vehicle controlling apparatus, the combination with a brake cylinder, of valve means operative to supply fluid under pressure to the brake cylinder to effect an application of the brakes, mechanism for controlling the opening and closing of a car door, means for supplying fluid under pressure to said mechanism to effect the opening of said door and for operating said valve means to supply fluid under pressure to the brake cylinder, and means operative when the car is moving at slow speed and when the first mentioned means are operated to open the door and supply fluid under pressure to the brake cylinder for limiting the pressure of fluid supplied to the brake cylinder.

9. In a vehicle controlling apparatus, the combination with a brake cylinder, of valve means operative to supply fluid under pressure to the brake cylinder to effect an application of the brakes, mechanism for controlling the opening and closing of a car door, means for supplying fluid under pressure to said mechanism to effect the opening of said door and for operating said valve means to supply fluid under pressure to the brake cylinder, a valve device for governing the pressure of fluid supplied to the brake cylinder, and means operable according to the speed of the car for controlling the operation of the last mentioned valve device.

10. In a vehicle controlling apparatus, the combination with a brake cylinder, of valve means operative to supply fluid under pressure to the brake cylinder to effect an application of the brakes, mechanism for controlling the opening and closing of a car door, means for supplying fluid under pressure to said mechanism to effect the opening of said door and for operating said valve means to supply fluid under pressure to the brake cylinder, a limiting valve device for limiting the pressure of fluid supplied to the brake cylinder when said means is operated to effect the opening of said door and when the car is in motion at low speed, and means operative according to the speed of the car for controlling the operation of said limiting valve device.

11. In a vehicle controlling apparatus, the combination with a brake cylinder, of valve means operative to supply fluid under pressure to the brake cylinder to effect an application of the brakes, mechanism for controlling the opening and closing of a car door, means for supplying fluid under pressure to said mechanism to effect the opening of said door and for operating said valve means to supply fluid under pressure to the brake cylinder, a limiting valve device for limiting the pressure of fluid supplied to the brake cylinder when said means is operated to effect the opening of said door and when the car is in motion at low speed, means operable electrically for controlling the operation of said limiting valve device and means operable according to the speed of the car for controlling the operation of the electrically operable means.

12. In a vehicle controlling apparatus, the combination with a brake cylinder, of valve means operative to supply fluid under pressure to the brake cylinder to effect an application of the brakes, mechanism for controlling the opening and closing of a car door, means for supplying fluid under pressure to said mechanism to effect the opening of said door and for operating said valve means to supply fluid under pressure to the brake cylinder, a limiting valve device for limiting the pressure of fluid supplied to the brake cylinder when said means is operated to effect the opening of said door and when the car is in motion at low speed, a magnet valve device for controlling the operation of said limiting valve device, and electric circuit for said magnet valve device, and a magnet switch device operable according to the speed of the car for controlling the opening and closing of said circuit to control the operation of said magnet valve device.

13. In a controlling apparatus for a motor driven vehicle, the combination with mechanism for controlling a vehicle door and mechanism for controlling the vehicle brakes, and means operative to cause both of said mechanisms to operate to effect the simultaneous opening of the door and the application of the brakes, and means for governing the braking force of the second mentioned mechanism, including an electrically controlled device having its circuit controlled according to the counter-electro-motive force of the vehicle motor.

14. In a vehicle controlling apparatus, the combination with an electric motor for propelling the vehicle and a circuit for supplying an electric current to operate said motor, of a door engine for controlling the opening and closing of a door of the vehicle when the vehicle is in motion at any speed or at a stop, and means operated upon movement of the door engine at any time to the position for opening the door for effecting the opening of the motor circuit.

15. In a vehicle controlling apparatus, the combination with an electric motor for propelling the vehicle and a circuit for supplying an electric current to operate said motor, of a door engine for controlling the opening and closing of a door of the vehicle when the vehicle is in motion at any speed or at a stop, and means operated by said door engine for controlling the opening and closing of the motor circuit.

16. In a vehicle controlling apparatus, the combination with an electric motor for propelling the vehicle and a circuit for supplying an electric current to operate said motor, of a door engine for controlling the opening and closing of a door of the vehicle when the vehicle is in motion at any speed or at a stop, and means operated upon movement of the door engine at any time to the position for opening the door for effecting the opening of the motor circuit and operated upon movement of the door engine at any time to the position for closing the door for effecting the closing of the motor circuit.

17. In a vehicle controlling apparatus, the combination with an electric motor for propelling the vehicle and a circuit for supplying an electric current to operate said motor, of a door engine for controlling the opening and closing of a door of the vehicle when the vehicle is in motion at any speed or at a stop, electrically controlled means for opening and closing the motor circuit, and means operative by said door engine for controlling the operation of said electrically controlled means.

18. In a vehicle controlling appartus, the combination with an electric motor for propelling the vehicle and a circuit for supplying an electric current to operate said motor, of a door engine for controlling the opening and closing of a door of the vehicle when the vehicle is in motion at any speed or at a stop, a magnet switch device operative upon energization to close the motor circuit and upon deenergization to open said circuit, and means operated by said door engine for controlling the energization and deenergization of said magnet switch device.

19. In a vehicle controlling apparatus, the combination with an electric motor for propelling the vehicle and a circuit for supplying an electric current to operate said motor, of a door engine for controlling the opening and closing of a door of the vehicle when the car is in motion at any speed or at a stop, a magnet switch device operative upon energization to close the motor circuit and upon deenergization to open said circuit, and means operated by said door engine upon effecting the opening of the car door for effecting the deenergization of said magnet switch device.

20. In a vehicle controlling apparatus, the combination with an electric motor for propelling the vehicle and a circuit for supplying an electric current to operate said motor, of a door engine for controlling the opening and closing of a door of the vehicle when the vehicle is in motion at any speed or at a stop, a magnet switch device operative upon energization to close the motor circuit and upon deenergization to open said circuit, and an electric switch operated by said door engine for controlling the energization and deenergization of said magnet switch device.

21. In a vehicle controlling apparatus, the combination with means for effecting an application of the brakes when the operator become incapacitated and means for effecting a service application of the brakes, of means operative automatically according to the speed of the car for limiting the braking power of the second mentioned means when a service application of the brakes is effected with the vehicle moving at a low speed, and means for preventing the operation of the first mentioned means to effect an application of the brakes when the braking power of the second mentioned means is limited.

22. In a vehicle controlling apparatus, the combination with a door engine operated by fluid under pressure for effecting the opening of a door of the vehicle, a door opening pipe, a fluid pressure supply pipe, a brake valve device for establishing communication through which fluid under pressure is supplied from said supply pipe to said door opening pipe and a brake cylinder, of a valve operative to supply fluid under pressure from said supply pipe to the brake cylinder to effect an application of the brakes, an abutment subject to the pressure of fluid supplied to said door opening pipe for operating said valve to supply fluid under pressure to the brake cylinder, and means controlled according to the speed of the vehicle for governing the supply of fluid under pressure to the brake cylinder.

23. In a vehicle controlling apparatus, the combination with a device for effecting an emergency application of the brakes when the operator becomes incapacitated, of a main reservoir pipe, a valve operative to supply fluid under pressure from said main reservoir pipe to effect an application of the brakes and to prevent the operation of said device to effect an emergency application of the brakes, a door engine operated by fluid under pressure for effecting the opening of a door of the vehicle and a piston subject to the pressure of fluid supplied to said door engine for operating said valve.

24. In a vehicle controlling apparatus, the combination with a door engine operated by fluid under pressure for effecting the opening of a door of the vehicle, a main reservoir, a brake cylinder and a valve device operated by fluid under pressure for preventing an emergency application of the brakes, of a straight air pipe through which fluid under pressure is supplied at one time to the brake cylinder for effecting an application of the brakes and to said valve device, a valve operative to supply fluid under pressure at another time from said main reservoir to the brake cylinder and to said valve device, and an abutment subject to the pressure of fluid supplied to said door engine for operating said valve.

25. In a vehicle controlling apparatus, the combination with a door engine operated by fluid under pressure for effecting the opening of a door of the vehicle, a main reservoir, a brake cylinder and a valve device operated by fluid under presure for preventing an emergency application of the brakes, of a straight air pipe through which fluid under pressure is supplied at one time to the brake cylinder for effecting an application of the brakes and to said valve device, valve means subject to the pressure of fluid supplied to said door engine for at another time supplying fluid under pressure from the main reservoir to the brake cylinder for effecting an application of the brakes and to said valve device, and means for limiting the supply of fluid under pressure from said valve means to the brake cylinder.

26. In a vehicle controlling apparatus, the combination with a door engine operated by fluid under pressure for effecting the opening of a door of the vehicle, a main reservoir, a brake cylinder and a valve device operated by fluid under pressure for preventing an emergency application of the brakes, of a straight air pipe through which fluid under pressure is supplied at one time to the brake cylinder for effecting an application of the brakes and to said valve device, valve means subject to the pressure of fluid supplied to said door engine for at another time supplying fluid under pressure from the main reservoir to the brake cylinder for effecting an application of the brakes and to said valve device, and means controlled according to the speed of the vehicle for controlling the supply of fluid under pressure from said valve means to the brake cylinder.

27. In a vehicle controlling apparatus, the combination with an electric motor for propelling the vehicle and a circuit for supplying an electric current to operate said motor, of a door engine for controlling the opening and closing of a door of the vehicle when the vehicle is in motion at any speed or at a stop and for controlling the opening and closing of the motor circuit.

In testimony whereof I have hereunto set my hand, this 26th day of February, 1929.

ELLERY R. FITCH.